United States Patent
Oberhart

[15] 3,665,161
[45] May 23, 1972

[54] CARD READOUT SYSTEM

[72] Inventor: George S. Oberhart, San Mateo, Calif.
[73] Assignee: Albert J. Day
[22] Filed: Oct. 20, 1969
[21] Appl. No.: 867,567

Related U.S. Application Data

[63] Continuation-in-part of Ser. No. 855,868, Aug. 4, 1969, Pat. No. 3,600,012.

[52] U.S. Cl. .................................235/61.7 B, 340/149 A
[51] Int. Cl. ..................................G05b 1/08, G06k 7/04
[58] Field of Search ............235/61.7 B, 61.7, 61.12, 61.114, 235/61.11; 340/149 A, 172.5; 194/4; 179/2 CA, 6.3 CC

[56] References Cited

UNITED STATES PATENTS

| | | | |
|---|---|---|---|
| 3,090,833 | 5/1963 | Zenner | 235/61.11 R |
| 3,184,714 | 5/1965 | Brown et al. | 340/149 A |
| 3,443,069 | 5/1969 | Bjorn | 235/61.11 E |

Primary Examiner—Thomas A. Robinson
Assistant Examiner—Thomas J. Sloyan
Attorney—Naylor & Neal

[57] ABSTRACT

A system employing encoded cards and a card readout machine wherein the cards incorporate both embossments and electrically conductive means which cooperate with said machine to read out information encoded on individual cards. The readout machine which is employed in the system may be adapted for either "on line" usage with a computer or perform "off line" functions. In the latter arrangement the readout machine incorporates means to punch a memorized code thereinto, means to read encoding embossments on a card and means including electrical circuitry to determine for card verification purposes whether or not embossment encoding on the card complements the combination punched into the machine. The off line machine further includes means cooperating with electrically conductive encoding means on the card to determine whether or not the card is counterfeit. The on line machine incorporates means for reading a card encoded with both embossments and printed circuitry and for feeding the encoded information to an electronic data processing (EDP) center. In addition, the on line machine may be utilized to feed to the EDP center information relating to such matters as the location of the machine, the amount of money being charged and/or information regarding the source of the card being utilized in combination with the machine.

2 Claims, 15 Drawing Figures

Patented May 23, 1972

3,665,161

INVENTOR.
GEORGE S. OBERHART
BY
Naylor & Neal
ATTORNEYS

Patented May 23, 1972

INVENTOR.
GEORGE S. OBERHART
BY Naylor & Neal
ATTORNEYS

INVENTOR.
GEORGE S. OBERHART
BY Naylor & Neal
ATTORNEYS

INVENTOR.
GEORGE S. OBERHART
BY
Naylor & Neal
ATTORNEYS

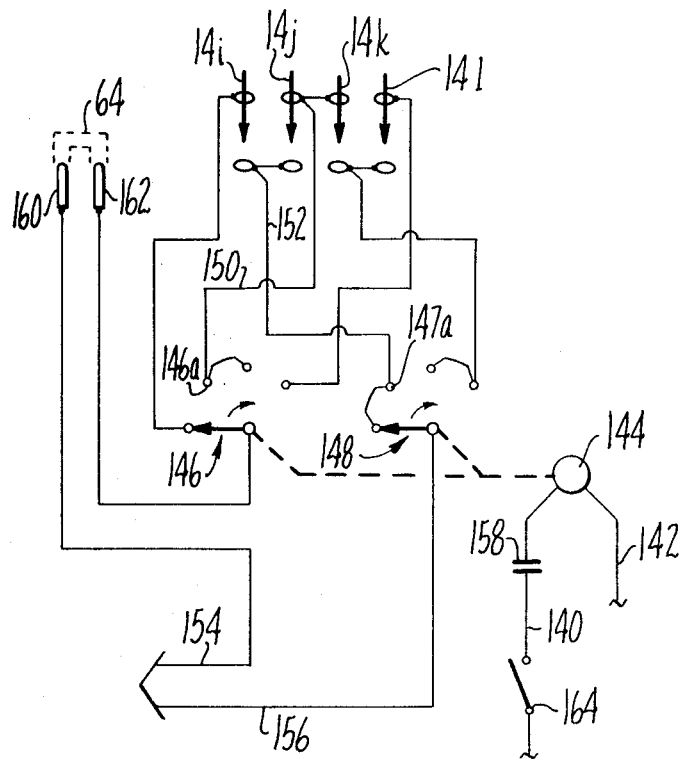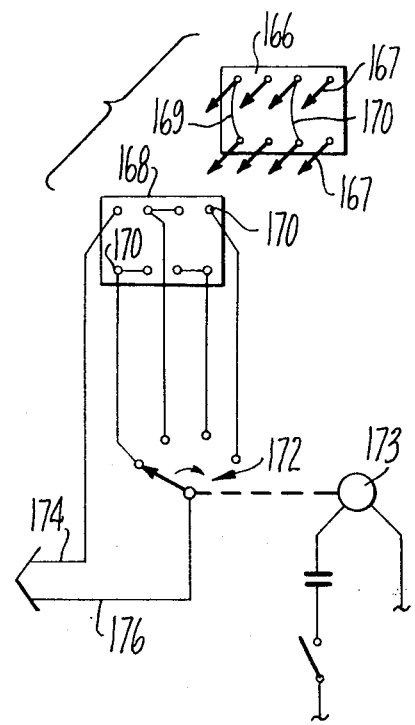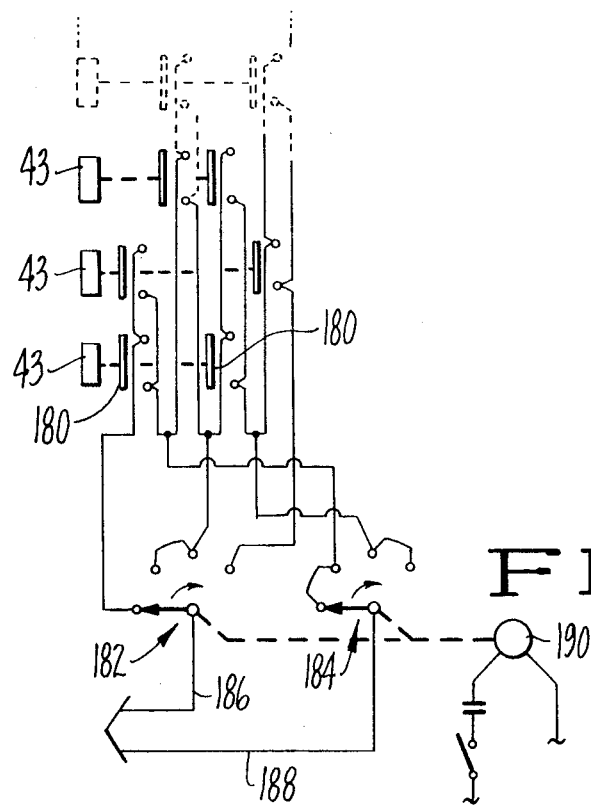

CARD READOUT SYSTEM

This application is a continuation-in-part of Ser. No. 855,868, filed Aug. 4, 1969 now U.S. Pat. No. 3,600,012 and entitled VERIFICATION SYSTEM.

BACKGROUND OF THE INVENTION

The present invention relates to a system for reading out information encoded on cards, and more particularly, credit cards. In its more specific aspects, the invention is concerned with a system wherein information encoded on a card by means of embossments and electrically conductive means is read out by a machine for purposes of card verification and/or data processing.

In the prior art, electrically and magnetically encoded cards for use in verification and related systems are known. Electrically encoded cards have been suggested primarily for use with electrical locks where the card functions as a key. U.S. Pat. No. 3,134,254 suggests such an arrangement wherein the key is either encoded with a resistance or capacitance component. In this patent, the key is verified through an oscillator circuit which is tuned for acceptance of only a properly encoded card. While the circuit is capable of adjustment to accommodate different keys, this adjustment may not be accomplished in a ready and selective manner so that the same verifying mechanism might be employed for the ready verification of differently encoded keys. Thus, the circuit is not well suited for credit card verification purposes.

Magnetically encoded cards have been suggested primarily for use in identification systems wherein it is desired to repeatedly change the encoding of the cards. These systems require relatively complex readout and recording means and typically rely upon the employment of some type of master recording for comparison purposes. The magnetic character of the encoded cards renders them susceptible to inadvertent change and the readout and recording systems are, inherently, relatively complex. Both of these characteristics, together with the requirement for some type of master recording for comparison purposes, render systems of this type ill-suited for mass credit card verification.

In addition to the electrical and magnetic verification systems of the type described above, the prior art also suggests electromechanical readout systems for use with embossed or perforated credit cards. These systems have been suggested for employment in large credit card operations to determine whether a particular card has been invalidated. They rely on a relatively complex system of electrical comparison and are not well-suited for verifying the identity of the card user. Such prior art systems do not have sufficient flexibility nor are they inexpensive enough to permit their use by smaller organizations. In addition, the credit operations of separate companies vary widely depending upon individual requirements.

SUMMARY OF THE INVENTION

It is therefore an object of the present invention to provide a relatively simple system for reading out desired information from an encoded card, such as a credit card.

It is a further object of the present invention to provide a system wherein a single encoded card may be used at the option of a store or other organization asked to grant credit to the card holder to either send certain encoded information to a centralized location for processing or utilize the encoded information at the transaction site for verification purposes.

These and additional objects have been attained in the present invention by providing a system employing encoded cards and a card readout machine wherein the cards incorporate both encoding embossments and encoding electrically conductive means which cooperate with a suitable mechanism in said machine to permit the reading out of the encoded information. According to one embodiment of the machine the encoded information may be compared with memorized information provided by the card holder to verify the authority of the holder. In addition, encoded information on the card may be utilized to determine whether it is of counterfeit construction. In an alternative approach the readout machine may be utilized to feed selected encoded information obtained from the card to a data processing facility along with information relating to the source and amount of the transaction and the source of the card.

DESCRIPTION OF THE DRAWINGS

The above-noted and other objects of this invention will be understood from the following description taken with reference to the drawings wherein:

FIGS. 13, 14 and 15 are diagrammatic plan views illustrating circuitry employed in an on line card readout machine.

DESCRIPTION OF THE ILLUSTRATED EMBODIMENT

Figure 1:
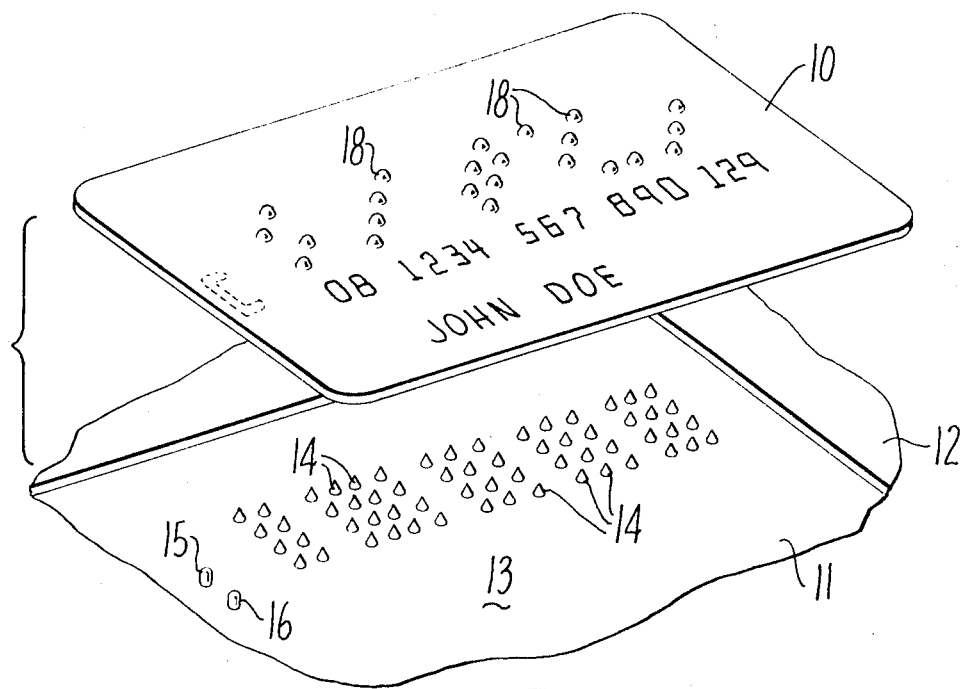
FIG. 1 is a perspective view illustrating a credit card utilized in the present system as well as details of a portion of a card readout machine.

Referring now to FIG. 1 of the drawings, a card 10 constructed in accordance with the teachings of the present invention is illustrated just prior to its insertion into the card receiving portion 11 of a readout machine 12 which is only partially illustrated. As stated above, the card according to the present invention may be utilized with the readout machine adapted for either off line or on line use. Regardless of the adaptation of the machine utilized with the card, the card receiving portion thereof may be identical. In FIG. 1, card receiving portion 11 is illustrated as comprising a recessed area formed in readout machine 12 which has substantially the same dimensions as card 10. The card receiving portion 11 has a substantially flat bottom surface 13 upon which the card 10 is adapted to firmly rest. It should be noted that a plurality of embossment detection pins 14 extend upwardly from flat surface 13. The construction and operation of these pins will be brought out in greater detail below. In addition to embossment detection pins 14, electrical contacts 15 and 16 extend upwardly from surface 13. The construction and operation of these electrical contacts will also be brought out in detail below.

Figure 2:
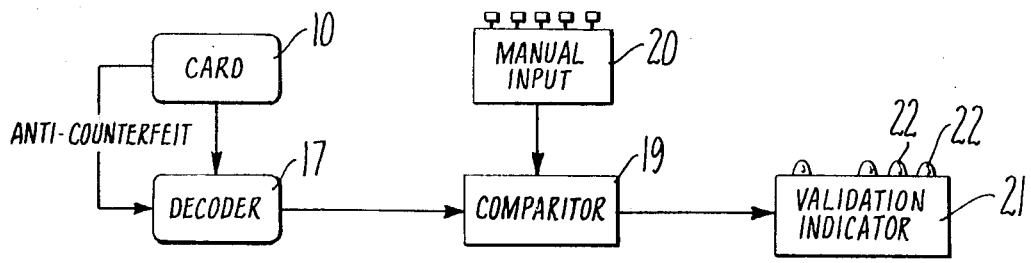
FIG. 2 is a diagrammatic illustration showing use of the credit card according to the present invention in an off line system.

Card 10 may be utilized in either on line or off line capacity. Referring now to FIG. 2 of the drawings, use of the card 10 is illustrated in conjunction with a readout machine adapted for off line usage. Quite briefly, such a machine incorporates a decoder mechanism 17 which is adapted to read out information encoded on card 10 by means of embossments 18 which are formed on the card (see FIG. 1). The decoded information is then transmitted to a comparator 19 which also receives information from a manual input mechanism 20. As will be seen below, the information obtained from this manual input mechanism consists of a code which is memorized by the card holder for validation purposes. This information is compared by comparator 19 with the read out code from decoder 17. Based upon this comparison a signal is sent from comparator 19 to validation indicator 21 whereupon an appropriate signal is indicated by means of one or more lights 22 incorporated on validation indicator 21. An anticounterfeit mechanism is operatively associated with the decoder device 17 in a manner which will be described in greater detail below.

Figure 3:
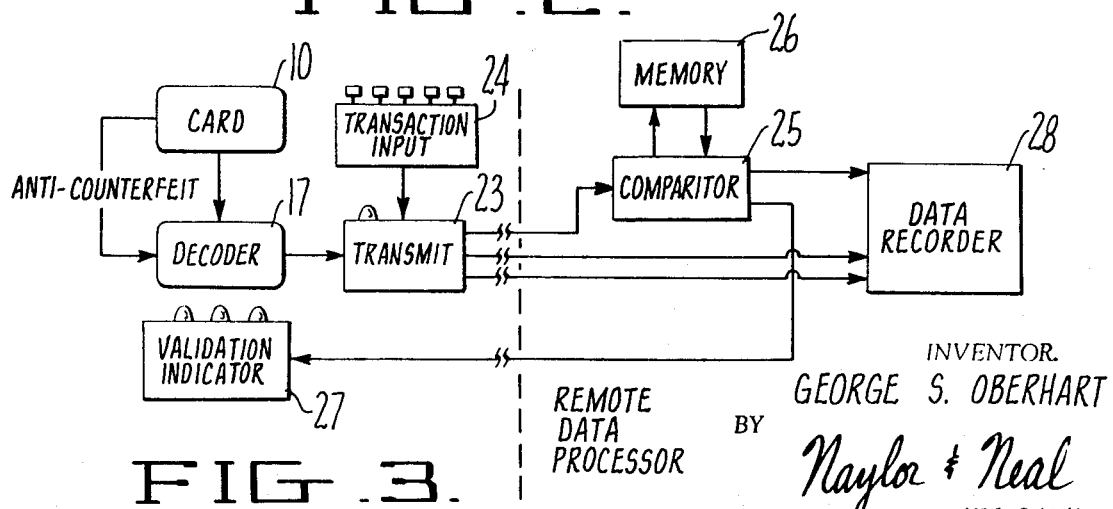
FIG. 3 is a diagrammatic illustration showing the use of the credit card according to the present invention on line with a centralized computer system.

In FIG. 3 card 10 is illustrated as being used in conjunction with a readout machine having an on line capability. As with the off line machine, an anticounterfeit mechanism is employed in the on line machine circuitry. The on line machine also employs a decoder 17 which is adapted to read out encoded information on card 10. This information is conveyed to transmit mechanism 23 which also receives transaction information from transaction input mechanism 24. As will be described in greater detail below, transaction input mechanism 24 is adapted to convey to transmit mechanism 23 such information as the amount of the cash transaction and the identity of the merchant. The read out encoded information from card 10 is transmitted by transmit mechanism 23 to a comparator device 25 which comprises an operating function of a remote data processing center. Comparator device 25 is tied into a computer memory bank 26 and the information from card 10 is checked with information stored in the memory bank to determine the status of the card. The result of this status check is immediately conveyed back from the remote data processor to a validation indicator 27 located at the side of the transaction. Such information is also fed by the comparator to a data recorder 28 which stores the card information for later use. Simultaneously with the transmission of the encoded card information further information relating to the merchant identification and transaction amount is conveyed directly from transmit mechanism 23 to data recorder 28 for subsequent billing action.

Figure 4:
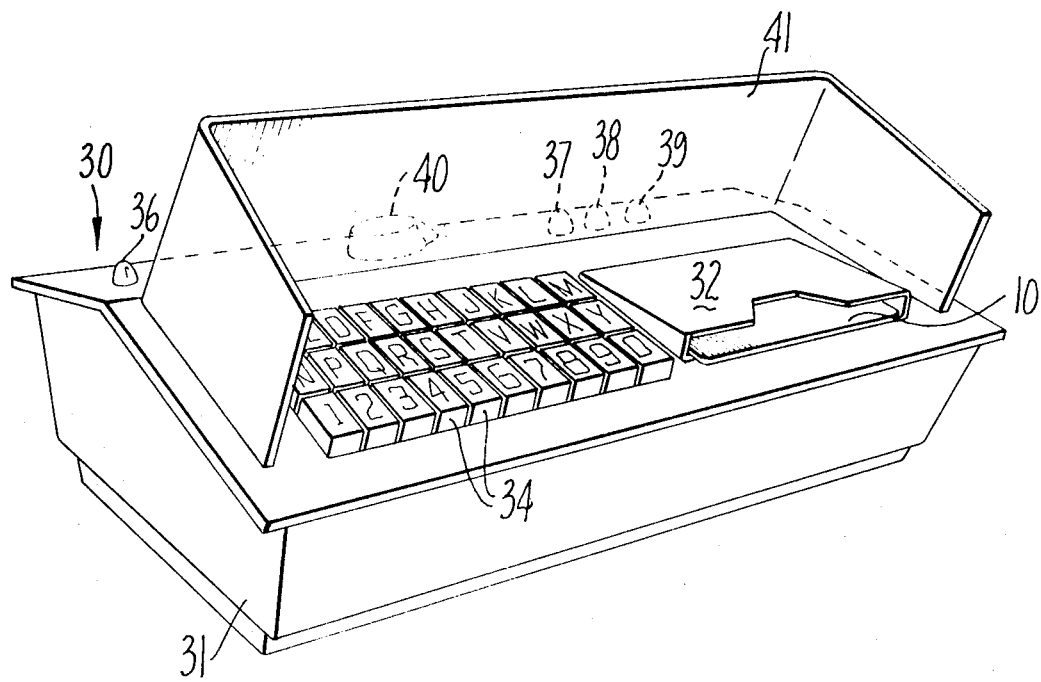
FIG. 4 is a perspective view illustrating a card readout machine adapted for use off line.

A readout machine adapted for off line capability as diagrammatically illustrated in FIG. 2 is shown in detail in FIG. 4. The machine which is generally indicated by means of reference numeral 30 comprises a housing 31 within which the validation circuitry is confined. A card 10 is illustrated as being disposed in the card receiving portion of the machine which was described in greater detail in FIG. 1. A press plate 32 which may be of any desired construction is disposed over the card receiving portion of the machine. Press plate 32 is adapted to be manually pressed downwardly from the raised position illustrated so that it contacts the upper surface of card 10 to place it into readout position. The precise construction of the press plate mechanism forms no part of the present invention so it has not been described in detail. In lieu of the press plate or similar mechanism the card 10 may, if desired, merely be directly, manually held by the operator into the readout position which will be described below. Disposed adjacent the card receiving portion of the machine are a plurality of push buttons 34 which as will become more apparent from the following detailed description provide for the selective adjustment of a circuitry within the machine 30. Numerical and/or alphabetical indicia associated with the push buttons provide for the adjustment of the circuitry in accordance with a predetermined code memorized by the operator. This feature will also be described in greater detail below. Disposed at the back of machine 30 is an on-off pilot light 36 as well as a credit limit light 37, a validation signaling light 38 and a fraud signaling light 39. The operation of these lights as well as the operation of selector switch 40 also disposed at the back of the machine 30 will become more apparent from the following detailed description of the circuitry. If desired, a shield 41 may be disposed between the various lights and switches disposed at the back of the machine and the front of the machine to prevent the credit card holder from observing their operation.

Figure 5:
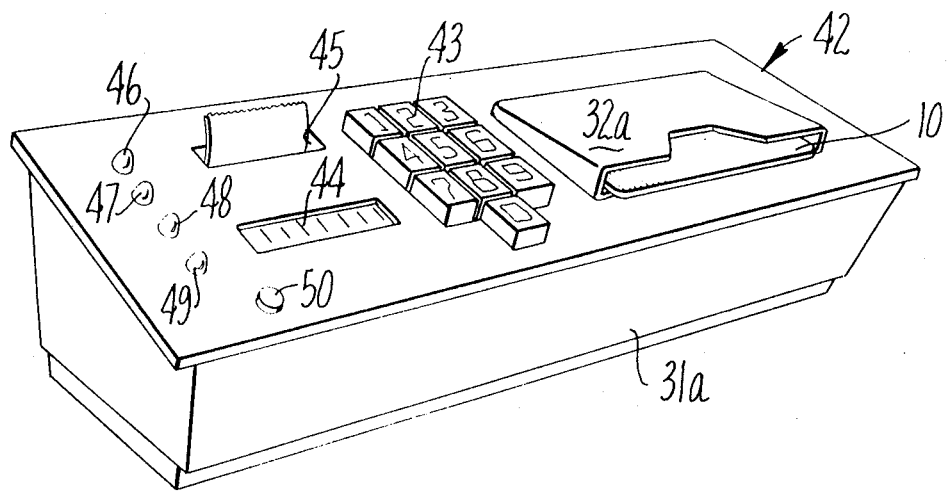
FIG. 5 is a perspective view illustrating a card readout machine adapted for on line use with a centralized computer system.

A readout machine adapted for on line use is illustrated in FIG. 5 and designated generally by means of reference numeral 42. The on line machine includes a housing 31a within which the machine circuitry is confined. On line machine 42 further includes a card receiving portion in which card 10 is illustrated as being positioned. A press plate 32a may be employed to urge card 10 in a downwardly direction so that it is firmly positioned. In addition to the card receiving portion, on line machine 42 includes a plurality of cash keys 43, a transaction display window 44 and a tape exit slot 45. In addition, on line machine 42 includes a transmission indicator light 46, a verification indicator light 47, a reject indicator light 48 and a credit limit indicator light 49. The function of these various lights will be brought out in greater detail below. An on-off push button may also be provided on the on line machine panel as indicated by reference numeral 50.

Figure 6:
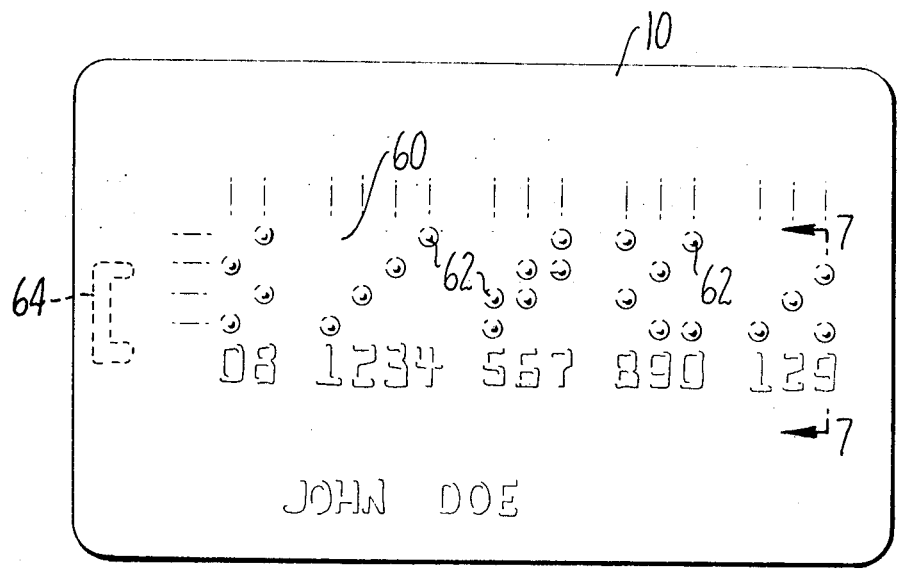
FIG. 6 is a plan view illustrating details of a credit card in accordance with the teachings of the present invention.

In FIG. 6, the credit card 10 suitable for use with either the above-described on line or off line machines is illustrated. The card 10 preferably has printed on the surface thereof the name of the card holder as well as the account identification number. Disposed above the account identification number is an encoding area 60 in which a plurality of embossments 62 are formed in the card. In the illustrated embodiment there are four potential embossment positions located in line above each of the numerals of the account identification number. Using a four-bit binary code, the position and numbers of the embossments are determined. In the event the account identification utilizes an alpha-numeric system an additional row of potential embossment positions may be established to provide an accommodation for a five-bit binary code. For purposes of illustration in this application, however, it will be assumed that a numeric identification system is utilized and that a four-bit binary code is employed.

In addition to the embossment encoding area 60, card 10 includes a second encoding area in which second encoding means is positioned. The second encoding means comprises a strip 64 of electrically conductive material which is disposed on the underside of card 10. Preferably strip 64 comprises a metal material which is stamped onto the surface of a card. Alternatively, however, the strip 64 may comprise printed circuit wire formed on the card.

The manner in which card 10 and the encoding means thereof operates in conjunction with the readout machines will now be described in detail.

Figure 7:
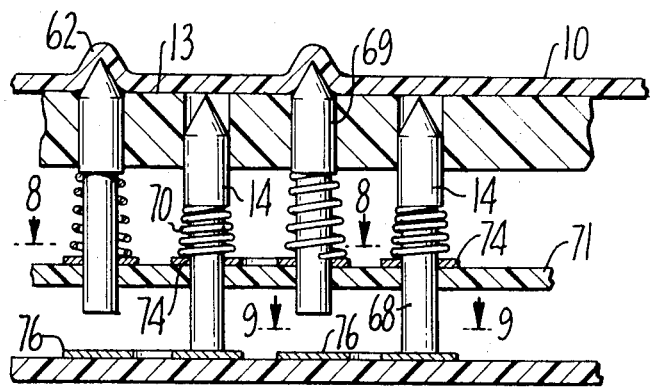
FIG. 7 is a cross-sectional view taken along the line 7—7 of FIG. 6.
Figures 8, 9:
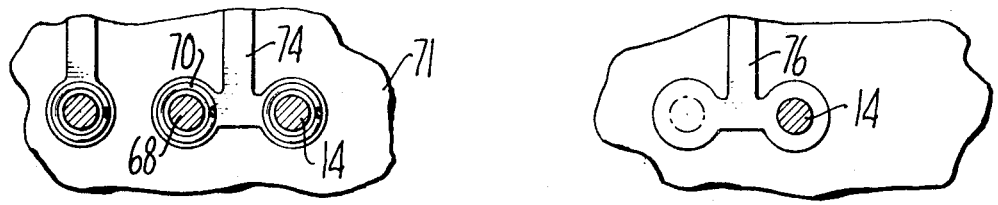
FIG. 8 is a cross-sectional view taken along the line 8—8 of FIG. 7.
FIG. 9 is a cross-sectional view taken along the line 9—9 of FIG. 7.

Referring now to FIG. 7, the internal construction of a machine according to the teachings of the present invention is shown in detail in that segment of the machine which is disposed immediately below the card receiving portion thereof. A credit card 10 is illustrated as being firmly in contact with flat surface 13 of the card receiving portion of the machine. The card, as previously stated, cooperates with a series of embossment detection pins 14 of the machine to read out the embossment encoded information. As shown in FIG. 1, there are four such pins for each numeral in the account identification number. The pins are placed in the machine to register with each of the four potential embossment areas disposed above each credit card numeral. Referring once again to FIG. 7, the four pins associated with only one such number are illustrated. Each of the pins comprises a shaft 68 and an enlarged head portion 69 which is conically shaped at the upper end thereof to conform to the internal surface of an embossment 62 formed on card 10. The pins are constructed of an electrically conductive material and are biased in an upwardly direction by means of springs 70. The pins pass through apertures formed in a nonconducting support plate 71 upon which a printed circuit 74 is formed. Springs 70 assist in making an electrical contact between each of the pins 14 and its associated contact of the printed circuit. A second printed circuit support board is provided below the pins with the contacts of the circuit 76 being in line with the pin shafts. It may readily be seen that when a pin 14 is urged into contact with its portion of printed circuit 76, an electrical connection is established between the respective pin associated contacts of printed circuit 74 and printed circuit 76. FIGS. 8 and 9 illustrate, respectively, selected portions of printed circuits 74 and 76. The springs 70 (FIG. 7) in addition to assisting in establishing electrical contact between the pins 14 and printed circuit 74 normally bias the pins in an upward direction so that they are out of contact with printed circuit 76. However, as soon as credit card 10 is positioned on flat support surface 13 the pins which are not in registry with embossments formed on the card are pushed in a downward direction into contact with printed circuit 76. The general arrangement shown in FIGS. 7, 8 and 9 is common to both the on line and the off line machines. The specific printed circuitry utilized in these machines, however, differs and the read out information is utilized in a different manner. In each case, however, the arrangement disclosed in FIGS. 7, 8 and 9 is adapted to perform a suitable switching operation in the machine circuitry.

Figure 10:
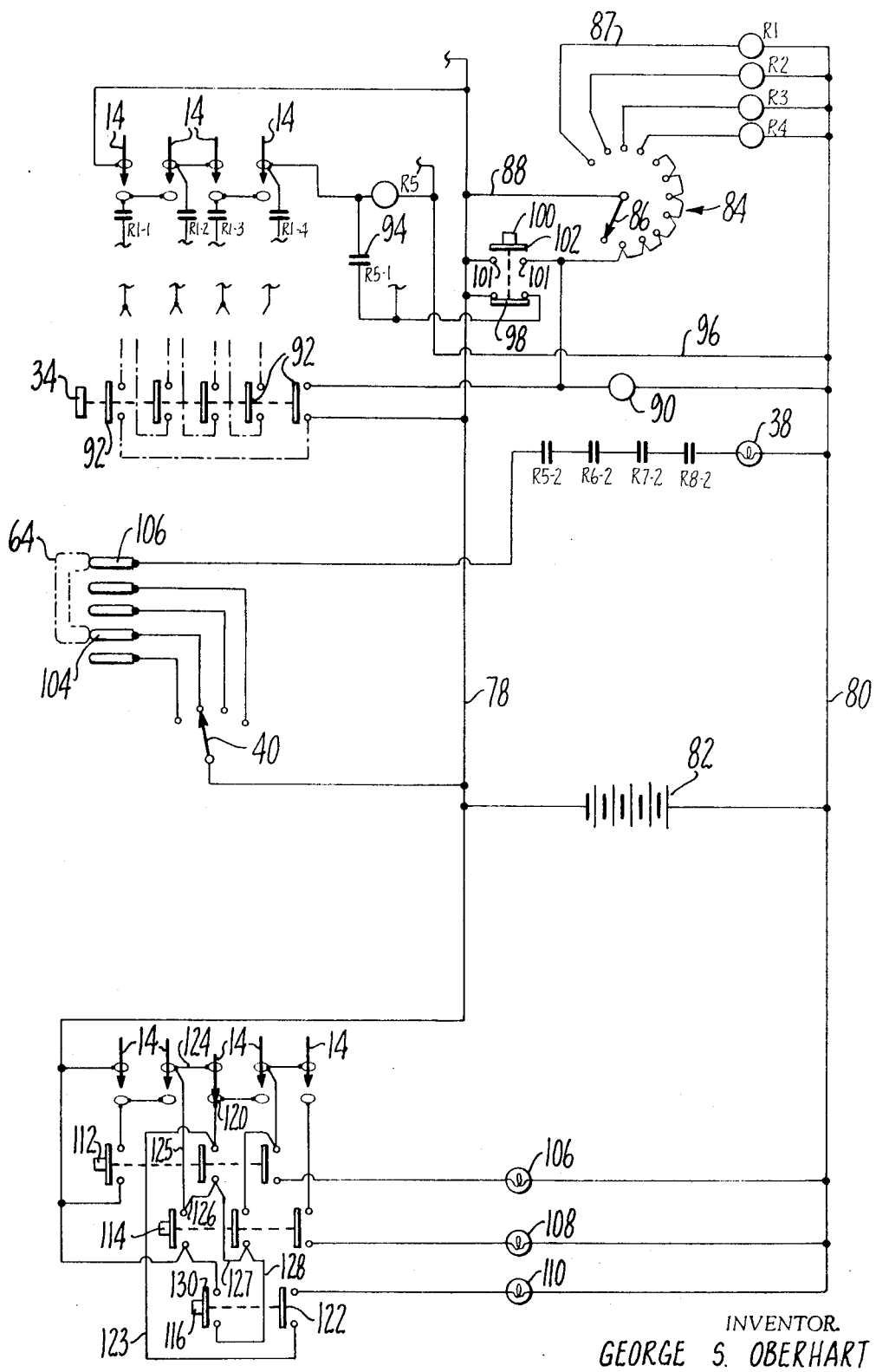
FIG. 10 is a diagrammatic plan view illustrating the circuitry employed in the off line card readout machine.

Turning now to FIG. 10, the circuitry utilized in the off line machine is illustrated in schematic fashion. Before describing the circuitry in FIG. 10 in detail, the general principles regarding usage of the off line machine should be considered. Before a customer may utilize a card in his possession to carry out a transaction the card will be checked to determine whether or not the holder is authorized to use it. To do this, the card is inserted into the off line machine so that encoded information on the card may be read out. This information is compared by the machine with a memorized code that the card holder feeds into the machine by means of a keyboard on the machine. Assuming the card and code match, a series circuit is established in the machine and a lamp is lit to indicate card verification. In the circuit illustrated in FIG. 10 one push button 34 of the machine keyboard is illustrated. It is, of course, to be understood that the operation of the other keys in the machine keyboard is identical. In like manner, only one group of four embossment encoding detection pins is illustrated in the circuit. It is, of course, to be understood that there is one group of four pins for each digit of memorized number. In describing the operation of the circuit it will be assumed that four memorized digits must be compared by the machine before validation signaling light 38 is lit.

The off line machine circuit includes input power lines 78 and 80 operatively connected to a power source 82 which is preferably a source of low voltage direct current. Parallel connected to input power line 80 are a plurality of relay coils R-1, R-2, R-3 and R-4 which are line connected to four separate contacts of a step switch 84. The movable contact 86 of the step switch 84 is connected to input power line 78 through line 88. It may thus be seen that a series circuit is completed through relay coil R-1 when the movable contact 86 contacts the terminal of line 87 associated with that relay coil. Movement of the movable contact on 86 is controlled by means of a stepping switch coil 90 when said stepping switch coil is actuated. Clockwise movement of the movable contact 86 sequentially energizes coils R-1, R-2, R-3 and R-4 in an obvious manner. Each one of the relay coils is operatively associated with one group of four pins 14. In the circuit as illustrated, relay coil R-1 is adapted when energized to close normally open contacts R-1-1, R-1-2, R-1-3 and R-1-4 which are associated with pins 14. In like manner, relay coils R-2, R-3 and R-4 are adapted when energized to close similar contacts related to other pin groupings (not shown) utilized in the off line machine. The push button 34 of FIG. 10 is illustrated in general layout form only and the detailed construction of each push button 34 employed in the off line machine will be better understood with reference to a detailed discussion presented below. At this juncture, however, it is sufficient for proper understanding of the FIG. 10 circuitry to know that the push button is operatively associated with a push rod to which a series of contact plates 92 are attached. As will be described in detail below, the position and number of such contact plates employed with respect to each push button are determined in such a manner as to cooperate with the pins 14 to complete a circuit through the pins and contact plates when the digit of the memorized code to which push button 34 relates corresponds to the encoded information read out from the card 10 by means of pins 14. When a series circuit is completed through contact plates 92 and pins 14 a relay coil R-5 will be disposed in the same series circuit. Energization of relay coil R-5 serves to close normally open latching contact 94 which is disposed in parallel with relay coil R-5 and also to close normally open contact R-5-2 which is positioned in series with validation signaling light 38.

It should be noted that the innermost contact plate 92 associated with push button 34 completes a circuit through stepping switch coil 90 when the push button is depressed. As previously stated, energization of switch coil 90 advances movable contact 86 of step switch 84 one position, i.e., into contact with the terminus of line 87. Relay coil R-1 is therefore energized and normally open contacts R-1-1, R-1-2, R-1-3 and R-1-4 are closed thus permitting completion of the series circuit through pins 14 and contact plates 92 of the push button 34.

As push button 34 is released, the series circuit established through the contact plates and pins 14 is broken. However, relay coil R-5 remains energized since a series circuit has been established upon closing of latching contact R-5-1 through line 96 the relay coil R-5 latching contact R-5-1 and a normally closed switch 98 associated with reset button 100. Contact R-5-2 thus remains closed as long as this series circuit is completed. Depression of reset button 100, however, pushes switch 98 in a downwardly direction breaking the circuit and deenergizing relay coil R-5. Further depression of reset button 100 causes upper contact plate 102 to contact terminals 101 operatively associated with step switch 84. Such contact causes movable contact arm 86 to resume the position illustrated thus deenergizing relay coil R-1 and opening contacts R-1-1 through R-1-4.

Assuming, however, that reset button has not been depressed and contact R-5-2 remains closed, it may be seen that three additional contacts disposed in series with validation signalling light 38, i.e., contacts R-6-2, R-7-2 and R-8-2, must be closed before the light 38 may be energized. These latter three contacts are operatively associated with three different push buttons 34 (not shown) which are tied into the circuit of FIG. 10 in the same manner as the illustrated push button 34. Upon depression of the push button (not shown) operatively associated with contact R-6-2, for example, the movable contact 86 of step switch 84 moves to the second position wherein a series circuit will be completed through coil R-2. If the digit represented by the second push button 34 corresponds to the encoded information read out by the second group of pins 14 the contact R-6-2 will be closed. Assuming that the last two memorized digits are also the correct ones, contacts R-7-2 and R-8-2 will also be closed in like manner.

Even assuming all four of the contacts associated with light 38 are closed, a circuit will not yet be completed through that light. For such a circuit to be closed the company identification selector switch 40 must be set at the correct position and the machine must sense that the card being used is not a counterfeit one. To encode card 10 for company identification the length of strip of electrically conductive material 64 on the card is varied so that a strip of a given length represents one company, a strip of another length another company and so on. Switch 40 must be positioned to correspond with the encoded company identification as represented by the length of the strip before validation signaling light 38 will be lit. In FIG. 10 switch 40 is illustrated schematically as being set to the correct position with a series circuit being established through switch 40, company identification contact 104, which is positioned on the machine, strip 64 and company identification contact 106. Tracing the circuit further current then flows through contacts R-5-2, R-6-2, R-7-2, R-8-2 and thence through validation signaling light 38. In the absence of a strip of electrically conductive material on the card as in the case of a counterfeit card, no such validating circuit will be established. In like manner, incorrect setting of company identification selector switch 40 will leave an open circuit.

The off line machine also has a credit rating capability and the circuitry for performing this function is shown at the bottom of FIG. 10. The illustrated circuit employs three credit limit lamps 106, 108 and 110 all of which are connected at one terminal thereof to power input line 80. These lamps may, if desired, be of a different color and each lamp is adapted to display to the operator of the machine embossment encoded information on the credit card relating to credit limitations imposed on the card holder. More or less than three credit levels may, of course, be built into the off line machine's capability. The credit rating circuitry may be best understood by way of illustration. Once again, the principle of establishing a series circuit through one or more push button contact plates and one or more pins 14 is utilized. It will be assumed for illustration purposes that the credit card inserted in the machine contains encoded embossed information setting forth a low, say $200.00, limitation on the maximum amount of purchase. It will be assumed that when this encoded information is read out by the pins only the middle pin 14 is depressed in the manner shown into engagement with contact 120 since it is the only pin not received within an embossment. Lamp 110 when lit signals a $200.00 limitation. Push button 116 is associated with this lamp. In practice the machine operator will selectively depress each of the push buttons 112, 114 and 116 until one of the lamps is lit to indicate the credit status of the card holder. Upon depression of credit push button 116 a series circuit is established through lamp 110 thereby lighting it. The series circuit may be traced as follows: current flows from input power line 80 through the lamp 110 and thence through contact plate 122 associated with push button 116. Current then continues through line 123 to contact 120. Since middle pin 14 is in engagement with contact 120 current flow continues through the pin through lines 124, 125, 126, 127 and 128 to contact 129. Completing the circuit current flows through contact plate 130 of credit push button 116 to power input line 78. It will be readily understood that push buttons 112 and 114 and their associated lamps 106 and 108, respectively, operate in a similar fashion when the correct pins 14 indicating these different credit levels are depressed.

Figure 11:
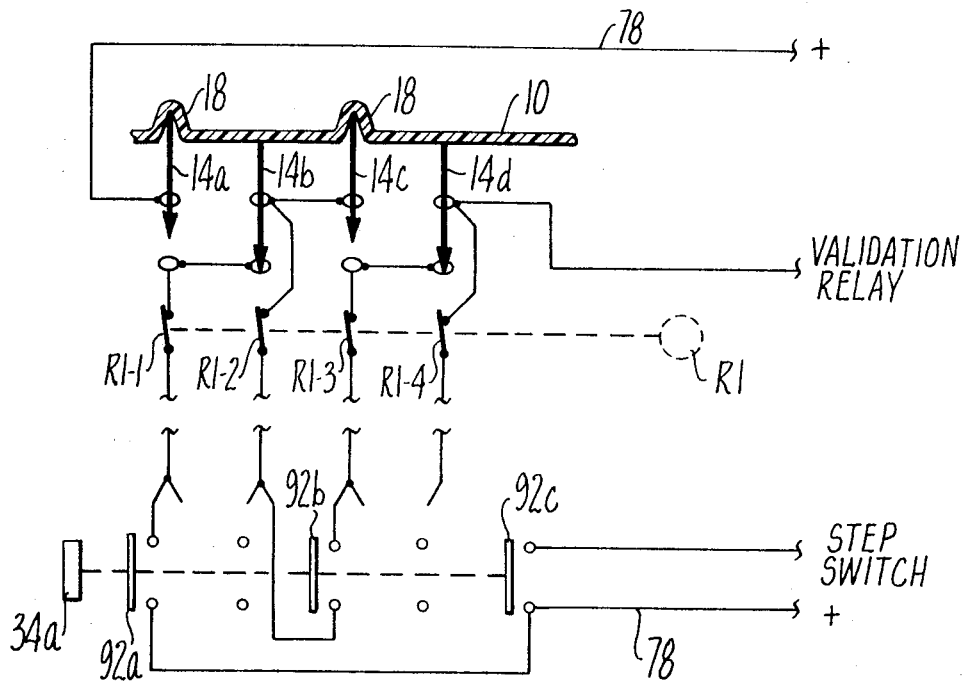
FIGS. 11 and 12 are diagrammatic plan views illustrating the operation of a portion of the circuitry of FIG. 10 in combination with a credit card according to the present invention employing different encoding embossments.
Figure 12:
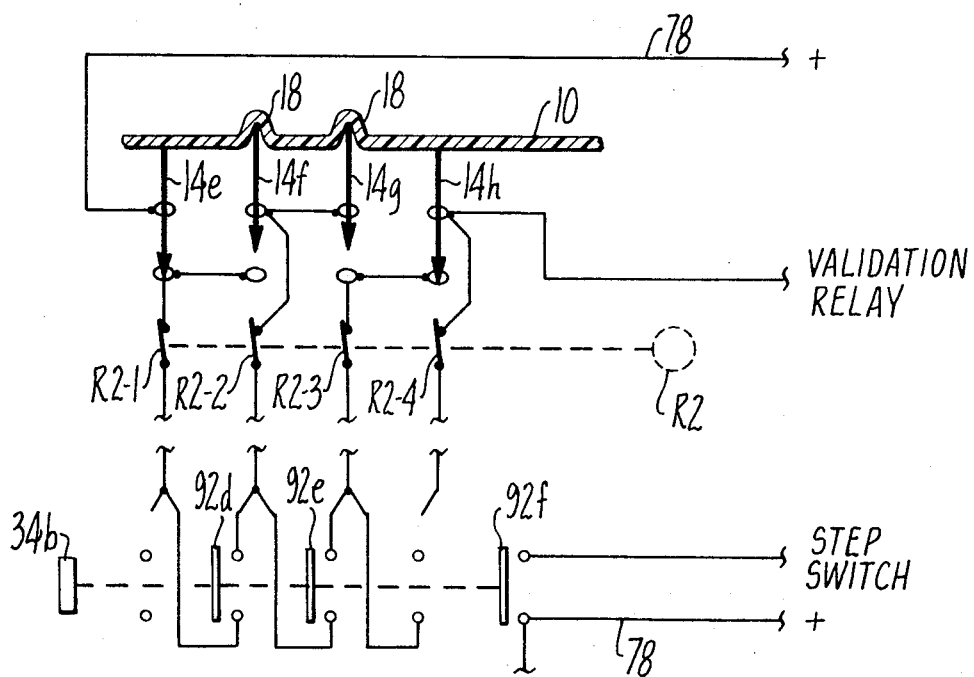

Returning once again to the validation segment of the off line machine circuitry, FIGS. 11 and 12 illustrate in greater detail the cooperation between the machine push buttons and the associated pin groupings. It may be assumed that the same card 10 is shown in both drawings. However, two separate groupings of embossment detection pins are illustrated in these figures as reading out embossed encoded information on the cards relating to two different numbers, as represented by the different embossment patterns which are based on a predetermined binary code. For example, assume that the following four-bit numeric binary code is used:

```
1 - 0001        6 - 0110
2 - 0010        7 - 1100
3 - 0100        8 - 1010
4 - 1000        9 - 0101
5 - 0011        0 - 1001
```

In this case the illustrated FIG. 11 embossment pattern represents the numeral 9 and the illustrated FIG. 12 embossment pattern represents the numeral 0.

Referring now more specifically to FIG. 11, the illustrated push button 34a is adapted to complete a series circuit when the memorized numeral represented by that push button complements the encoded numeral read out by the embossment detector pins (here identified as pins 14a, 14b, 14c and 14d). To do this each push button 34a has operatively associated therewith one or more contact plates 92 arranged in a pattern differing from that employed with respect to all the other push buttons. In FIG. 11 three plates 92a, 92b and 92c are illustrated with pin 92c actuating the step switch as previously described. Assuming that the normally open latches associated with the pin circuitry here identified as latches R-1-1 through R-1-4 are closed by their associated relay coil (in this instance relay coil R-1) upon depression of push button 34a plates 92 engage their respective contacts to complete a series circuit. In the FIG. 11 illustration, current will flow from the power input line 78 through plate 92a, contact R-1- 1, pin 14b, contact R-1-2, plate 92b, contact R-1-3, pin 14d and thence to the previously described validation relay coil.

In FIG. 12, depression of the push button 34b would also complete a series circuit. Here the current flow may be traced from the power input line 78 through pin 14e, contact R-2-1, plate 92d, plate 92e, contact R-2-3, pin 14h and thence to the associated validation relay coil.

FIGS. 13, 14 and 15 illustrate circuitry employed in the on line readout machine. Specifically, FIG. 13 relates to circuitry for reading out embossed encoded information from a card whereupon such information is transmitted to a remote data processor (as shown in FIG. 3). An anticounterfeit arrangement is employed in this circuitry to detect the existence of a fraudulent card. Basically, the circuit of FIG. 13 is adapted to serially transmit to a remote data processor an indication of the position of each embossment detection pin in a group corresponding to each digit of an account number embossment coded in a card. It is, of course, to be understood that a circuit similar to that shown in FIG. 13 is in operative association with the remote data processing equipment and said equipment employs conventional pulsing and sensing means (not shown) to determine which pin group is being analyzed and to switch to the next pin group after said analysis is completed. The circuit includes power input lines 140 and 142 which lead to separate terminals associated with stepping relay coil 144. Stepping relay coil 144 serves upon closing of switch 164 to serially advance the sweep arms of step switches 146 and 147 so that they sweep in a clockwise manner, contacting each of four stationary contacts incorporated in said switches. Completion of a series circuit through said contacts and said sweep arms will result in an electrical pulse being sent to remote data processing facility thus indicating embossment detection pin position.

This may be best pointed out by illustration. Assume for example that detection pin 14j is the only pin of the group of four that is depressed. The depressed position of this pin is detected when the step switch sweep arms simultaneously reach the second contact position in their respective contact groupings, i.e., contacts 146a and 147a. At that point in time a series circuit will be completed (assuming a valid card) through the sweep arm of step switch 146, contact 146a, line 150, pin 14j, line 152, contact 147a and the sweep arm of step switch 148. It is to be assumed, of course, that the electrical series circuit is completed through computer tie lines 154 and 156 which are in electrically operative association with the remote data processing facility. Depression of one or more of the embossment detection pins will, of course, be detected in a similar fashion through operative engagement between the sweep arms of step switches 146 and 148 and the other contacts employed in the switches in an obvious manner.

It should be noted that a contact 158 is disposed in input line 140. Quite obviously this contact must be closed before a series circuit may be completed since stepping relay coil 144 will not otherwise be energized. Contact 158 is normally open and will be closed only upon receipt of a pulsing signal from the remote data processing facility. This constitutes the manner in which the electrical circuits relating to separate pin groupings are isolated by the computer. Upon completion of a series circuit in the manner previously described, verification indicator light 47 (FIG. 5) on the on line machine will be lit by receiving an electrical signal from the remote data processor.

In the event that a counterfeit card is being utilized in the system no validation signal can be received since a series circuit is not completed. This is due to the fact that current must flow through the strip 64 of electrically conductive material employed on a valid card to complete a circuit. Correctly encoded embossments only on the card are insufficient to complete the circuit. The strip 64 must also have the correct configuration to be placed into engagement with anticounterfeit contacts 160 and 162 incorporated on the machine. In the event the readout account number is established by the EDP center to belong to a stolen or lost card reject indicator lamp 98 is lit. In like manner, the memory bank of the EDP center may establish a shaky credit rating for the member, in which case credit limit light 49 will be lit.

Referring now to FIG. 14, a circuit incorporated in the on line machine is illustrated whereby merchant identification information is transmitted to the data processing facility. Since several merchants will in all probability be utilizing the remote data processing facility it is desirable to have some means to identify the site where the transaction is to be carried out. This is done by providing each merchant with a shorting plug 166 which is adapted to be plugged by means of electrically conductive contact pins 167 into a circuit board 168. Shorting plug is coded by means of electrical connectors such as wires 169 and 170 which are connected in a predetermined pattern between selected pins which is unique for each merchant site.

Pins 167 are in electrically conductive engagement with contacts 170 on the circuit board. Wire leads are connected between the contacts to a plurality of contacts incorporated with a step switch 172. The step switch is actuated through a coil 173 to sweep the movable contact arm of the step switch in a clockwise direction when the coil is energized. Energization of the coil is accomplished in a manner similar to that previously discussed with respect to stepping relay coil 144 in the circuit of FIG. 13 and will not be discussed further. The movable arm of the step switch cooperates with the contacts thereof to complete one or more series circuits through computer tie lines 174 and 176 leading to the remote data processing facility thus transmitting to said facility information regarding merchant identification.

The final circuit employed in the on line machine is illustrated in FIG. 15 wherein four keys of a ten key cash keyboard assembly are illustrated. Each key of course represents a separate digit. The principles involved in the operation of the keyboard assembly may be set forth rather briefly. Quite simply each key 43 thereof is associated with one or more contact plates 180, the members and positions of which differ for each key. Plates 180 are adapted to contact one or more pairs of open terminals to set up one or more circuits which are closed when the sweep arms of step switches 182 and 184 hit one or more line step switch contacts. The remote data processing facility is tied into the circuits through computer tie lines 186 and 188. The step switches are actuated upon energization of stepping relay coil 190 with such coil receiving successive actuating pulses from the facility computer to repeat the sweeping action of the step switches, thus serially transmitting to the data processing facility consecutive digits of the transaction amount. Since hardware for accomplishing this is well known in the prior art and since the electronic data processing equipment per se forms no part of the present invention it will not be described further.

With reference to the disclosed system, it should be pointed out that modifications in the structure of the card and readout equipment employed therein may be modified as required. For example, the card may be encoded using five-bit binary system for an alpha-numeric account number. In addition, the V-shape of encoding strip 64 is shown for illustrative purposes only and such strip may be straight, for example, and be located in a position other than the left-hand side of the card.

I claim as my invention:

1. A machine for verifying a credit card encoded with embossments, said machine comprising:
  a. a card receiving station adapted to receive a card in a predetermined position relative thereto;
  b. a plurality of embossment sensing means adapted to sense the embossment condition of a card received in the card receiving station;
  c. a first plurality of switch means associated, respectively, with the respective embossment sensing means to indicate the embossment condition sensed by the sensing means;
  d. a second plurality of switch means, said switch means being selectively operable to complement the respective switch means in the first plurality of switch means to complete a plurality of circuits therewith upon connection thereto;
  e. operating means to connect said first and second pluralities of switch means and sequentially access the circuits completed by disposition of said first and second pluralities of switch means in complementary condition;
  f. relay means responsive to said operating means to complete a monitoring circuit upon the accessing of a complete series of completed circuits by the operating means;
  g. signal means to signal the completion of the monitoring circuits; and,
  h. detection means adapted to sense the presence of a detection area on a predetermined portion of a credit card received in the card receiving station, said detection means functioning to interrupt the monitoring circuit in the absence of the sensing of a detection area and being selectively adjustable to sense the presence of a detection area at different predetermined portions of a credit card received in the card receiving station.

2. A machine according to claim 1, wherein:
  a. the detection area comprises an electrically conductive strip; and,
  b. the detection means comprises at least one pair of spaced contacts disposed to normally interrupt the monitoring circuit, said contacts being contactable with the electrically conductive strip of a card received in the card receiving station to complete the monitoring circuit.

* * * * *